Oct. 8, 1963 A. DUQUESNEL 3,106,117
DEVICE FOR MOUNTING INSERT GUIDE-RAILS
NOTABLY IN MACHINE TOOLS
Filed March 2, 1961
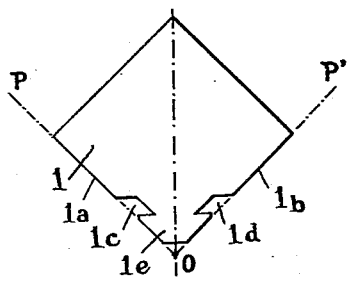
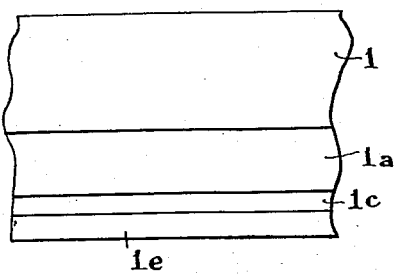
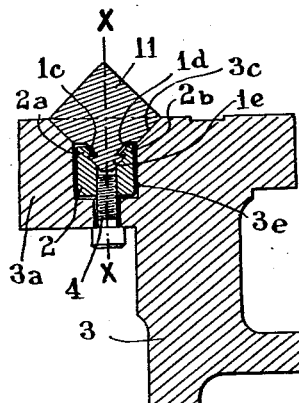
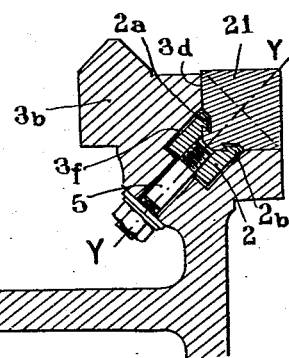
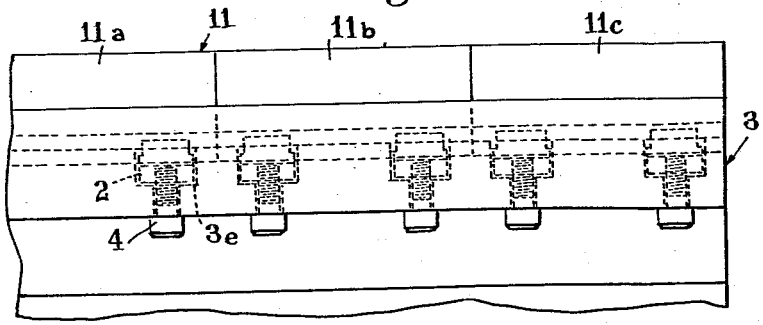
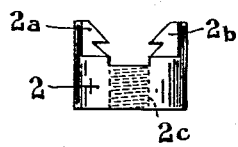
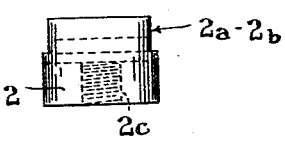
INVENTOR
ANDRÉ DUQUESNEL
BY
ATTORNEYS United States Patent Office 3,106,117
Patented Oct. 8, 1963

3,106,117
DEVICE FOR MOUNTING INSERT GUIDE-RAILS NOTABLY IN MACHINE TOOLS
André Duquesnel, Moulins-sur-Allier, Allier, France, assignor to Societe en nom Collectif so-called Etablissements Lefebvre & Martin, Moulins, France
Filed Mar. 2, 1961, Ser. No. 92,845
3 Claims. (Cl. 82—32)

This invention relates essentially to means for securing an insert guide rail or like member, notably for the carriage of a machine tool.

A device of this character has already been proposed in the U.S. Patent No. 2,092,587. According to this patent, the guide rails are heat-treated and ground to accurate tolerances before mounting them on the frame of the machine and they are secured thereon by using as a rule mild-steel members engaging recesses provided to this end in the guide rail, these members being subsequently fastened to the guide rail for example by screwing and welding them in the guide rail. The fastening members are formed with inner threads engaged by bolts for tightly locking the guide rails on the machine frame.

However, this known fastening device is attended by several drawbacks.

In fact, the recesses formed in the bed or table of the machine and designed for receiving one portion of the screws and bolts used for fastening the guide rail must be machined to accurate limits, and their axes must register exactly with those of the fastening members rigid with the guide rail.

On the other hand, it is notoriously impossible to ensure a satisfactory junction between a plurality of guide rail sections disposed end to end for the lack of precision in the machining of the aforesaid recesses for screws and bolts may produce a gap between two adjacent guide rails.

It is the essential object of the invention to avoid the drawbacks set forth hereinabove by providing an improved device for securing an insert guide rail on a support, notably on the bed or table of a machine tool, for guiding a movable carriage or like element of the machine, wherein the guide rail bears with two adjacent faces on the registering faces of a V-shaped groove and is secured on the support through the medium of fastening members urged towards said support, this device being characterized in that the guide rail has a longitudinal groove formed in each bearing face, and that the intermediate fastening members are detachable and formed with a pair of claws adapted, when the guide rail is locked in its support, to project within the longitudinal grooves of the guide rail, said fastening members being locked in recesses formed to this end in the V-shaped groove of the support.

The aforesaid intermediate fastening members are held against motion in their relevant recesses in a manner already known per se by using any suitable devices such as screws or bolts.

The fastening device of this invention is characterized by a number of advantages in comparison with hitherto known devices of this character.

In fact, even when the recesses of the fastening members are not machined with a high degree of accuracy, the precision of the guiding is not impaired by the locking of these members, even if a considerable play is present in the assembly.

On the other hand, since it is thus possible to properly abut guide rail sections joined end to end, the fastening device of this invention permits of providing guiding assemblies comprising a plurality of rail or bar sections of relatively reduced length which are characterized by a considerable tolerance as far as their longitudinal dimension is concerned, this feature being particularly advantageous because shorter sections can be machined, heat-treated and assembled much more easily while being considerably less subject to distortion during these operations.

The use of relatively short guide-rail sections, without fastening holes, which can be machined with a high degree of precision, militates on the other hand in favour of the interchangeability of the guide rail assemblies consisting of these sections secured in accurately ground V-shaped grooves.

The grooves formed in the guide rails themselves may be machined before the heat treatment so that the parts can be hardened to the core without difficulty, a procedure obviously not applicable to guide rails or bars to be secured by means of holes bored and tapped beforehand or afterwards therein. The grooves may also be rough-machined before the heat treatment and ground thereafter, or even machined directly by grinding them in the mass.

This invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which:

FIGURE 1 is an end view of the guide rail or bar of this invention;

FIGURE 2 is an elevational fragmentary view of the guide rail;

FIGURE 3 is an end view of an intermediate fastening member;

FIGURE 4 is an elevational view of the same intermediate fastening member;

FIGURE 5 is a cross-sectional view showing the bed of an engine-lathe, on which two parallel guide rails or bars are secured according to the method of this invention; and FIGURE 6 is a side elevational view of the lathe bed, as seen from the left-hand side of FIG. 5.

In FIGS. 1 and 2 of the drawings the guide rail or bar 1 is shown as having a substantially prismatic configuration and a square cross-section although other shapes and cross-sections may be used. This guide rail 1 is adapted to bear through its faces $1a$ and $1b$ on the relevant faces of a V-shaped groove.

The planes P and P' of these faces $1a$ and $1b$ intersect each other at a vertex 0. Formed in the faces $1a$ and $1b$ at equal distances from the vertex 0 are a pair of longitudinal grooves $1c$ and $1d$ so as to form therebetween a rib $1e$.

FIGURES 3 and 4 illustrate a typical form of embodiment of the member provided for securing the insert guide rail 1 in its recess. This member consists of an intermediate fastening socket 2 formed at its upper end with a pair of registering claws $2a$, $2b$ adapted to engage the grooves $1c$ and $1d$ of guide rail 1.

The fastening socket 2 is formed on the other hand with a central cavity intermediate the claws $2a$ and $2b$ to permit the passage of the rib $1e$ of guide rail 1 which is formed by the grooves $1c$ and $1d$ as explained in the preceding paragraph.

The fastening socket 2 is also provided with a tapped central hole $2c$ engageable by a screw, stud or bolt adapted, when tightened, to exert a tractive effort on the socket 2 when the claws $2a$, $2b$ thereof engage the grooves $1a$, $1b$ of guide rail 1.

Typical applications of the guide-rail fastening device of this invention will now be described with reference notably to FIGS. 5 and 6.

In these figures the guide rails are shown as being inserted in the bed of an engine-lathe or like machine for guiding the main longitudinal carriage therealong.

The bed 3 is provided to this end, along its front ledge 3a with an insert guide rail 11 constituting the prismatic member for guiding the carriage at the front end, along its rear ledge 3b, with another insert guide rail 21 constituting the plan face supporting the rear portion of the carriage. The two guide rails 11 and 21 are mounted exactly in the same manner, with the only difference that the traction stress exerted on the guide rail 11 is directed vertically along the axis X—X whilst the traction stress exerted on the other guide rail 21 is directed obliquely along the axis Y—Y.

The guide rails 11 and 21 are received in V-shaped grooves 3c and 3d respectively, which are formed at spaced intervals with inner extensions forming recesses 3e, 3f in which the fastening sockets 2 are located.

As already explained hereabove, the claws 2a, 2b of sockets 2 engage the grooves 1c, 1d (FIG. 1) of guide rails 11 and 21, and these fastening sockets 2 are subjected in their corresponding recesses to a tractive effort applied in the direction of the bottom of these recesses, for example by means of a screw 4 or stud 5 reacting against the underlying face of the bed ledges.

In FIG. 5 it will be seen that as a consequence of the traction applied through the sockets 2 the guide rails 11 and 21 are pressed against the faces of grooves 3c, 3d so as to be firmly held in position.

In FIG. 6 it will be seen that the guide rail 11 may actually consist of a plurality of guide rail sections 11a, 11b, 11c received in end to end relationship in the groove 3c of bed 3. Associated with each guide rail element or section is a pair of fastening sockets 2 tightly locked in their recesses 3e by screws 4.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What I claim is:
1. Guide device for mounting on a support, notably on the bed of a machine tool, for guiding a movable carriage, wherein said support has cut therein a rectilinear V-shaped groove formed with side faces and with spaced bottom orifices leading to the exterior of said support, said device comprising a prismatic guide bar having two faces adapted to fit between and against said side faces of said support groove and formed each with a longitudinal groove, a plurality of fastening members comprising each on the one hand a pair of claws slidably engageable in said longitudinal grooves in the faces of said guide bar, and on the other hand a body freely engageable in one of said bottom orifices of said support groove, a tapped passage through said body, and clamping means each engaging from the exterior of said support one of said bottom orifices of said groove and the tapped passage of the fastening member fitted in said groove bottom orifice in order to clamp by screwing said two faces of said prismatic guide bar against said side faces of said rectilinear groove.

2. Guide device for mounting on a support, notably on the bed of a machine tool, for guiding a movable carriage, wherein said support has cut therein a rectilinear V-shaped groove formed with side faces and with spaced bottom orifices leading to the exterior of said support, said device comprising a prismatic guide bar having two faces adapted to fit between and against said side faces of said support groove and formed each with a longitudinal groove, a plurality of fastening members comprising each on the one hand a pair of claws slidably engageable in said longitudinal grooves in the faces of said guide bar, and on the other hand a body freely engageable in one of said bottom orifices of said support groove a tapped passage through said body, and a plurality of screws each engaging from the exterior of said support one of said orifices in the bottom of said groove and the tapped passage of the fastening member fitted in said groove bottom orifice in order to clamp by screwing said two faces of said prismatic guide bar against said side faces of said rectilinear groove.

3. Guide device for mounting on a support, notably on the bed of a machine tool, for guiding a movable carriage, wherein said support has cut therein a rectilinear V-shaped groove formed with side faces and with spaced bottom orifices leading to the exterior of said support, said device comprising a prismatic guide bar having two faces adapted to fit between and against said side faces of said support groove and formed each with a longitudinal groove, a plurality of fastening members comprising each on the one hand a pair of claws slidably engageable in said longitudinal grooves in the faces of said guide bar, and on the other hand a body formed with a tapped through passage, a stud having a threaded base engaging said tapped passage and a threaded end, the body of said fastening member projecting from the end of said support, and nuts each engaging from the exterior of said support the said threaded end of said stud of one of said fastening member for clamping, by screwing, the two V-forming faces of said prismatic bar against the side faces of said rectilinear groove of said support.

References Cited in the file of this patent

FOREIGN PATENTS

| | | |
|---|---|---|
| 151,838 | Great Britain | Oct. 7, 1920 |
| 344,984 | Italy | Dec. 5, 1936 |